(No Model.)
E. GUTMANN.
SUSPENDERS.
No. 482,963.   Patented Sept. 20, 1892.
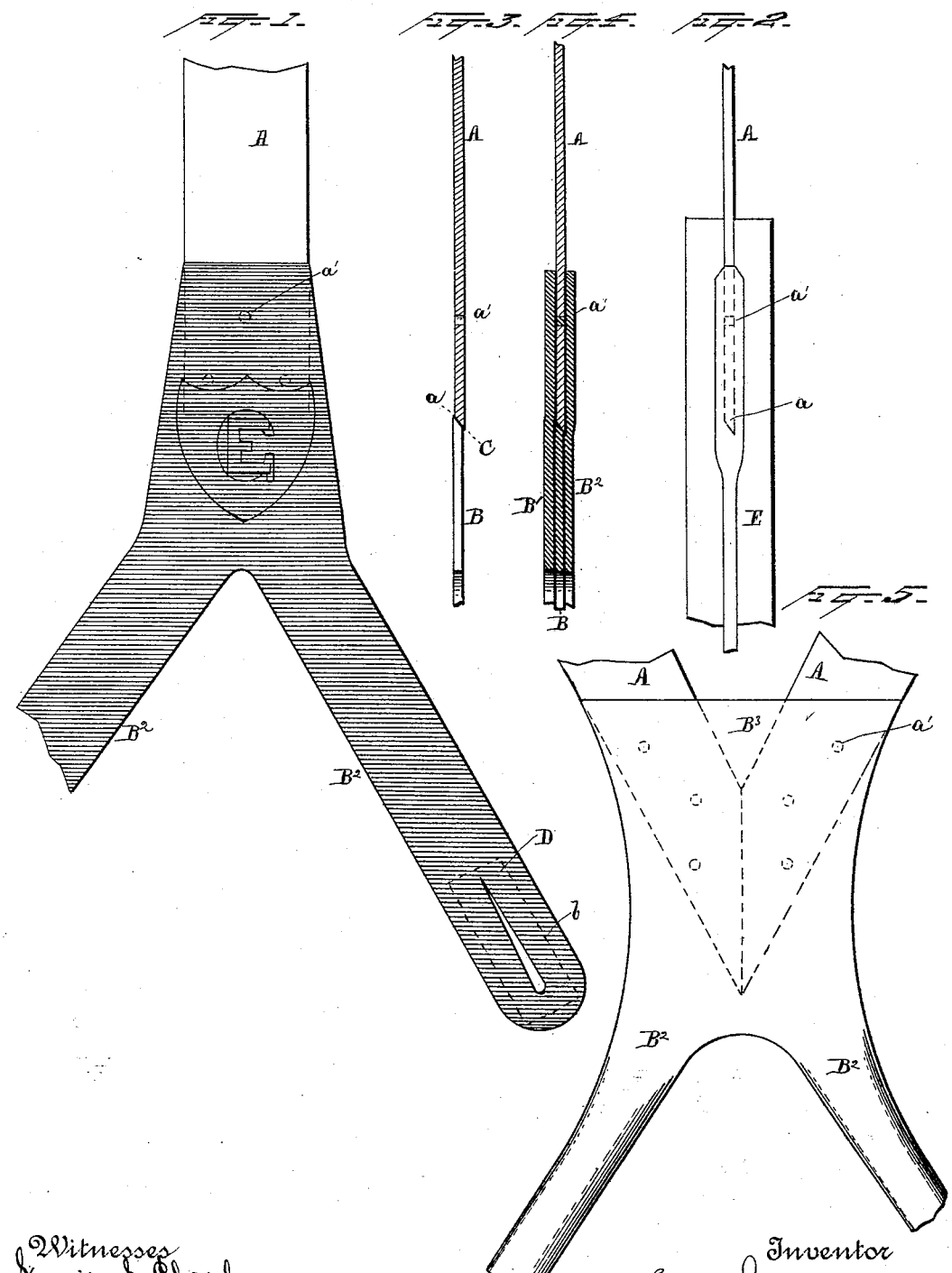

UNITED STATES PATENT OFFICE.

EMIL GUTMANN, OF NEW YORK, N. Y.

SUSPENDERS.

SPECIFICATION forming part of Letters Patent No. 482,963, dated September 20, 1892.

Application filed January 22, 1892. Serial No. 418,872. (No model.)

*To all whom it may concern:*

Be it known that I, EMIL GUTMANN, a citizen of the United States, residing in the city and county of New York, in the State of New York, have invented a certain new and useful Improvement in Suspenders, of which the following is a specification.

My improvement will apply to either end or to both ends of suspenders of any size and of any material and with any ordinary or suitable provisions for adjusting the length and for adjusting the point at which the suspenders are crossed and connected together at the back. I will describe it as applied to plain suspenders having no provision for varying the length and adapted like ordinary suspenders to be attached each to a single button at the back and forked and adapted to be attached to two buttons at the front. I have discovered that soft vulcanized rubber, pure or kneaded with the ordinary earthy or other ingredients, can, if properly worked, form the entire ends, being firmly and reliably united to the webbing which forms the main body of the suspenders.

The accompanying drawings form a part of this specification and represent what I consider the best means of carrying out the invention.

Figure 1 is a face view of a portion showing the peculiarities. Fig. 2 is an edge view showing, also, the mold in which it is inclosed for the vulcanization. Figs. 3 and 4 are corresponding sections showing the work in two stages of advancement. Fig. 3 shows the webbing with its end chamfered and a single sheet of rubber correspondingly chamfered and cemented thereto. Fig. 4 shows the same with an additional sheet of unvulcanized rubber cut to the proper form and cemented on each face, and Fig. 5 is a face view of a portion at the back.

Similar letters of reference indicate corresponding parts in all the figures.

A is the main body of the suspenders, woven of cotton, linen, or other suitable textile material. There may be the ordinary or any suitable provisions for imparting elasticity to the fabric longitudinally, and there may be jam-buckles or other ordinary or suitable means for varying the length at will. There are difficulties involved in having the bodies elastic.

My invention, by providing highly-elastic ends, so reduces the necessity for elasticity in the main body that I prefer to employ for the latter non-elastic webbing.

Soft rubber, unvulcanized, can be bought in all our principal markets in sheets of various thicknesses, and there can also be similarly purchased what is known as "rubber cement," composed of rubber dissolved in naphtha, which will adhere strongly to a rubber surface and will also penetrate into and adhere to the webbing. I procure a good quality of unvulcanized rubber in the form of sheets, having a thickness about equal to that of the webbing. Referring to Figs. 1, 2, 3, and 4 I scarf or chamfer the end of the webbing A by a sharp cutting-instrument, as shown at $a$, and punch by dies or otherwise produce a series of holes $a'$ in the suspender-ends. I produce a correspondingly-chamfered end of a strip of rubber B of a little greater width and apply the chamfered edges together and cement them with rubber cement C, the greater breadth of the rubber extending about equally beyond each edge of the webbing. After these parts are firmly joined and the naphtha or other solvent has evaporated I apply fresh rubber cement over both faces of the rubber strip B, allowing it to completely saturate that portion of the webbing, and apply the same also over a length of a couple of inches (more or less) on each face of the webbing adjacent to the end, and take care to also fill with the cement the holes $a'$ in the webbing A. I then apply on each face where the buttonhole is to be a sufficiently-large piece of muslin or other suitable thin and strong fibrous material D and coat with cement the outer face of the fabric thus applied. I then apply on the two faces thus prepared pieces $B'$ $B^2$, cut by dies or otherwise shaped from a strip of unvulcanized rubber, and after pressing these parts firmly together and exposing the goods in the air a sufficient length of time to allow the solvent in this second installment of cement to evaporate the whole of the rubber with the connected end of the webbing is inclosed in a strong mold E, securely fastened and exposed to a heat of about 270° to 290° Fahrenheit for about a half-hour or to the proper temperature and for a proper length of time, according to the character of the rubber, to effect complete vulcanization. The suspender-ends thus formed will give an attractive appearance and equable strength and elasticity throughout. The completed articles may require a little trimming by hand or by dies to remove superfluous material at the edges. They should be finished with the rubber corresponding in width to the webbing at the upper end, the rubber being somewhat broader at the lower end of the webbing. The molds should be formed so as to produce buttonholes $b$, slightly beaded, both for appearance and for strength.

Referring to Fig. 5, which shows the construction at the back, each length of webbing A is cut off diagonally and the two applied together in the oblique positions shown. The rubber is applied and vulcanized in place in a correspondingly-formed mold. (Not shown.) The triangular space $B^3$ at the top is fortified by a piece of rubber of about equal thickness to the web before applying the pieces $B'$ $B^2$ on each face and inclosed in the mold. The branches in this figure are shown as formed into round cords, which is easily effected by correspondingly forming the flat rubber $B'$ and $B^2$ into a tube and filling the middle with soft rubber or rubber cement before the vulcanizing.

The completed suspenders may be used in all respects like ordinary suspenders. The cloth lining D and the beading reinforces each buttonhole, so that it will not tear. The great elasticity of these ends is highly appreciated in all vigorous motions.

Modifications may be made without departing from the principle or sacrificing the advantages of the invention. Provisions may be made for varying the length of the webbing. Parts can be omitted.

The monogram "E G," sunk in the inner face of the mold and thereby raised on the outer face of the rubber where it covers the end of the webbing, may be replaced by any other device, or may be omitted altogether.

There may be the ordinary difference in the lengths of the two forks at the front, the one coming at the extreme front being the longest. The back ends may be made independent of each other, using correspondingly-shaped pieces of unvulcanized rubber both for the internal layer B and for the external layers $B'$ $B^2$ and corresponding molds. The branches at the front may be also rounded like the back. The branches at the back may be flat like the front.

I claim as my invention—

1. In the process of manufacturing suspenders, saturating with rubber cement a length of the webbing adjacent to the end, exposing the saturated webbing and allowing the solvent to evaporate, punching or otherwise producing the holes $a'$ therein, applying unvulcanized rubber, so as to fill and engage in such holes and also adhere to the saturated surfaces, and inclosing and vulcanizing the whole suspender-end, substantially as herein specified.

2. The process described for manufacturing suspenders, consisting in matching together and cementing the end of the webbing and a central piece of properly-shaped unvulcanized rubber, coating and saturating a sufficient length of the webbing adjacent to the end, applying one or more pieces of fabric for each buttonhole, cementing an additional sheet of unvulcanized rubber on each face, and inclosing and vulcanizing the whole suspender-end, all substantially as herein specified.

3. The suspender described, having the webbing A, with a portion adjacent to the end saturated with rubber, in combination with the rubber end B $B'$ $B^2$ and with a reinforcing piece of muslin D for each buttonhole applied between the sheets of rubber, so as to lie within the completed article, all substantially as herein specified.

In testimony that I claim the invention above set forth I affix my signature in presence of two witnesses.

EMIL GUTMANN.

Witnesses:
 THOMAS DREW STETSON,
 H. A. JOHNSTONE.